US011745107B2

(12) United States Patent
Lanchares et al.

(10) Patent No.: US 11,745,107 B2
(45) Date of Patent: Sep. 5, 2023

(54) METHOD AND APPARATUS FOR PROVIDING A COMPUTER IMPLEMENTED GAME

(71) Applicant: KING.COM LIMITED, St. Julians (MT)

(72) Inventors: Hugo Lanchares, Barcelona (ES); Julian Perez, Barcelona (ES)

(73) Assignee: KING.COM LTD., St. Julians (MT)

(*) Notice: Subject to any disclaimer, the term of this patent is extended or adjusted under 35 U.S.C. 154(b) by 487 days.

(21) Appl. No.: 15/852,114

(22) Filed: Dec. 22, 2017

(65) Prior Publication Data

US 2019/0030433 A1 Jan. 31, 2019

Related U.S. Application Data

(60) Provisional application No. 62/537,405, filed on Jul. 26, 2017.

(51) Int. Cl.
| | | |
|---|---|---|
| *A63F 13/577* | (2014.01) | |
| *A63F 13/58* | (2014.01) | |
| *A63F 13/57* | (2014.01) | |
| *A63F 13/92* | (2014.01) | |
| *A63F 13/537* | (2014.01) | |
| *A63F 13/812* | (2014.01) | |

(52) U.S. Cl.
CPC ............ *A63F 13/577* (2014.09); *A63F 13/58* (2014.09); *A63F 13/92* (2014.09); *A63F 13/537* (2014.09); *A63F 13/812* (2014.09)

(58) Field of Classification Search
CPC ...... A63F 13/58; A63F 13/537; A63F 13/577; A63F 13/2145

IPC ....................................................... A63F 13/577
See application file for complete search history.

(56) References Cited

U.S. PATENT DOCUMENTS

| | | | |
|---|---|---|---|
| 6,176,780 B1 | 1/2001 | Miyamoto et al. | |
| 8,128,476 B1 | 3/2012 | Sidhu et al. | |
| 2008/0291173 A1* | 11/2008 | Suzuki | A63F 13/10 345/173 |
| 2010/0081506 A1* | 4/2010 | Yoshikawa | A63F 13/04 463/37 |
| 2011/0112441 A1* | 5/2011 | Burdea | G06F 19/3418 600/595 |

(Continued)

OTHER PUBLICATIONS

Shatter (video game); Wikipedia; retrieved form the Internet: https://en.wikipedia.org/wiki/Shatter_(video_game); downloaded Jul. 8, 2021.

*Primary Examiner* — Thomas H Henry
(74) *Attorney, Agent, or Firm* — Saul Ewing LLP

(57) ABSTRACT

A computer device providing a computer implemented game, the computer device comprising a user interface configured to detect user input from a user of the game, at least one processor, and a display. A processor is configured to cause a game area to be displayed on the display, comprising a first game object and a plurality of third game objects; cause the first game object to be controlled in response to user input to cause a second game object to hit one or more of the third game objects; cause the hit third game objects to be removed from the game area; and determine when given ones of the third game objects have been removed and in response thereto cause another game area to be displayed, the first game object being moved to a position within the another game area.

26 Claims, 9 Drawing Sheets

(56) References Cited

U.S. PATENT DOCUMENTS

2011/0184248 A1* 7/2011 Furuta .................. A61B 5/0002
600/300
2014/0080558 A1* 3/2014 Knutsson ................ G07F 17/32
463/10
2016/0287991 A1* 10/2016 Norden ................ A63F 13/426

* cited by examiner

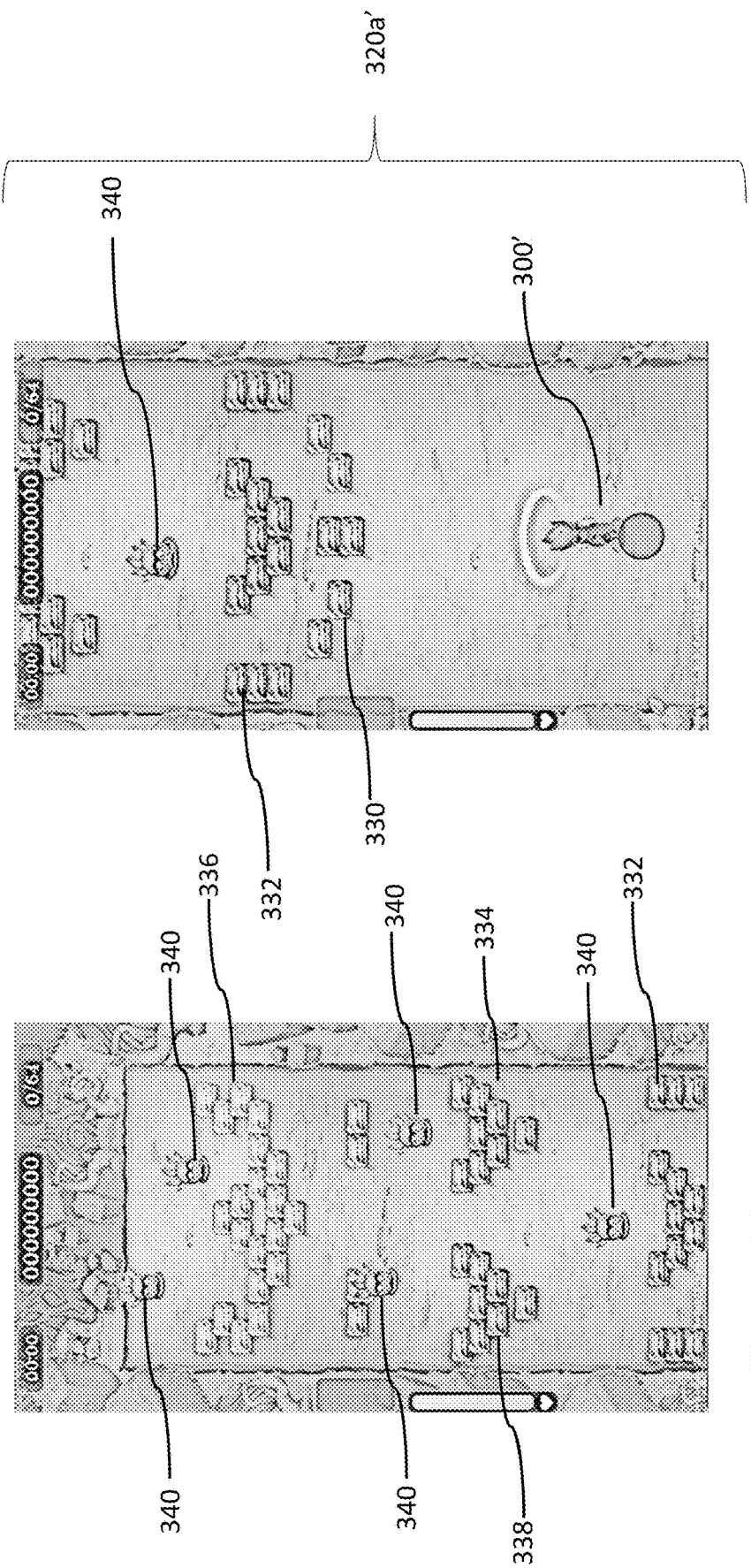

METHOD AND APPARATUS FOR PROVIDING A COMPUTER IMPLEMENTED GAME

CROSS-REFERENCE TO RELATED APPLICATIONS

This application is based on, and claims priority to, U.S. Provisional Application No. 62/537,405, filed on Jul. 26, 2017, the entire contents of which being fully incorporated herein by reference.

FIELD OF THE INVENTION

Embodiments of this application relate to a computer device for use in playing a computer implemented game and a method for providing a computer implemented game.

Some embodiments may relate to engaging users or players in a computer game executable in an online environment.

BACKGROUND OF THE INVENTION

There exist many types of computer device where the display is controlled by an input. In some embodiments the input may be a cursor or pointer that is controlled by a human interface device such as a mouse, joystick, keyboard etc. Additionally or alternatively the display may comprise a touchscreen which can be controlled by a user's touch. That is, activation of functions and/or objects is responsive to user input made by way of the user touching a particular object displayed on the screen, and thereby selecting that object.

Computer implemented games are known and are often played on devices such as smart phones. Such devices often have a relatively small display area. One technical challenge with such games is how to provide technical complexity of a game whilst at the same time providing a varied gaming experience for the user. Another technical challenge relates to how to keep players interested whilst using limited resources of a device on which a game is being played.

One technical challenge can involve allowing a game to be fun and compelling even when there is limited display resource. A limited display resource provides challenges such as how a user can interact with a particular part of the display. Another challenge relates to how to provide complexity which is able to be rendered in a visual distinct manner on the relatively small display.

Another significant challenge is that of user engagement. Engagement involves designing gameplay and devices to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment. Often this needs to be provided in the context of an environment where only a limited number of resources of a computing device can be used in running the computer implemented game.

This patent specification describes not only various ideas and functions, but also their creative expression. A portion of the disclosure of this patent document therefore contains material to which a claim for copyright is made and notice is hereby given: Copyright King.com Limited 2017 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect there is provided a computer device providing a computer implemented game, said computer device comprising a user interface configured to detect user input from a player of said game, at least one processor, and a display, said at least one processor being configured to: cause a first part of a game area to be displayed on said display, said first part of the game area comprising a first game object and a plurality of third game objects; cause said first game object to be controlled in response to user input received via said user interface to cause at least one second game object to hit one or more of said third game objects; cause said hit one or more third game objects to be removed from the first part of said game area; and determine when given ones of said plurality of third game objects have been removed and in response thereto to cause a second part of the game area the displayed, said first game object being moved to a position within the second part of the game area.

The at least one processor may be configured to cause the display to initially scroll through all of the game area.

The at least one processor may be configured to cause the display to scroll from the first part of the game area to the second part of the game area.

The first and second parts of the game area may be overlapping.

The first and second parts of the game area may be non-overlapping.

The given ones of the third game objects may be arranged in one or more groups. The causing of the second part of the game area to be displayed may occur when all of the third game objects in the one or more groups have been removed.

The game area may comprise at least three parts. The at least one processor may be configured to cause a next part of the game area to be displayed when given third game objects in a previous part of the game area have been removed.

The at least one processor may be configured to determine if a first third game object is a first item that the second game object has hit after interaction with the first game object and if so to cause said second game object to continue on its path to remove at least one further third game object as well as said first third game object.

The at least one processor may be configured to determine for at least one third object which has been hit if at least one condition has been satisfied and to only remove that third object when the condition has been satisfied.

The at least one condition may comprise that the third object has been hit an equivalent of n times, where n is an integer greater than one.

The at least one processor may be configured to update a count value when a respective third object has been hit.

The second game object may have a power attribute value such that when the second game object hits a first third game object, the at least one processor updates the count value by m, where m is an integer greater than one and dependent on the power attribute value.

The at least one processor may be configured to update the power attribute value after the second game object has hit the first third game object.

The second game object may hit a further third game object after hitting the first third game object. The at least one processor may be configured update the count value for that further game object by an integer value less than m, in dependence on the updated power attribute value.

The second game object may have a power attribute value such that when the second game object hits a given number of items, the power attribute value is updated.

The given number of items may be one.

The second game object may have a power attribute value and at least one third object may have a third object value indicating an amount of power required to remove the respective third object. The at least one processor may be configured to update the third object value when the second game object hits the third object by an amount dependent on the power attribute value of the second game object.

The respective third object may be removed when the third object value has a given value.

According to an aspect there is provided a computer implemented method for providing a computer implemented game on a computer device comprising a user interface configured to detect user input from a player of said game, at least one processor, and a display, the method comprising: causing a first part of a game area to be displayed on said display, said first part of the game area comprising a first game object and a plurality of third game objects; causing said first game object to be controlled in response to user input received via said user interface to cause at least one second game object to hit one or more of said third game objects; causing said hit one or more third game objects to be removed from the first part of said game area; and determining when given ones of said plurality of third game objects have been removed and in response thereto causing a second part of the game area the displayed, said first game object being moved to a position within the second part of the game area.

The method may comprise determining if a first third game object is a first item that the second game object has hit after interaction with the first game object and if so causing said second game object to continue on its path to remove at least one further third game object as well as said first third game object.

The method may comprise determining for at least one third object which has been hit if at least one condition has been satisfied and only removing that third object when the condition has been satisfied.

The at least one condition may comprise that the third object has been hit an equivalent of n times, where n is an integer greater than one.

A count value may be updated when a respective third object has been hit.

The second game object may have a power attribute value. The method may comprise, in response to the second game object hitting a first third game object, updating the count value by m, where m is an integer greater than one and dependent on the power attribute value.

The power attribute value may be updated after the second game object has hit the first third game object.

In response to the second game object hitting a further third game object after hitting the first third game object, the count value may be updated for that further game object by an integer value less than m, in dependence on the updated power attribute value.

According to another aspect, there is provided a non-transitory computer readable storage device having a computer readable program code stored therein, said computer readable program code containing instructions configured to be executed by at least one processor of a computer device causes said at least one processor to perform the steps of the method.

According to some aspects, there is provided a program product comprising a computer-readable storage device including a computer-readable program for providing a computer-implemented game, wherein the computer-readable program when executed on a computer causes the computer to perform any one or more of the method steps described previously.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 2A shows an upper part of a game area of an example game;

FIG. 2B shows the initial part of the game area of the example game;

DETAILED DESCRIPTION OF SOME EMBODIMENTS

One example of a game with which embodiments may be used is a so-called 'brick or block breaker game' where the player is required to manoeuvre a paddle type game object to bounce objects such as projectiles or balls into other objects such as bricks or blocks.

The game area is generally provided with walls and the projectile is able to bounce off the wall. The walls may be provided on one or both sides of the screen and/or at the upper end of the screen. The paddle may be positioned at an end of the screen not having a wall. This may be the lower end of the screen. It should be appreciated that the walls may angled with respect to the screen edge and/or parallel with respect to the screen edge. The walls may extend along only a partial extent of the display area of the screen and/or to a full extent. The walls may be flat and/or curved. There may be one or more walls.

On contact with ball or projectile, one or more bricks are destroyed. If the ball or projectile moves past the paddle then a life may be lost. The player may be provided with any number of lives, equal to one or more. The aim of the game is generally to remove all the bricks.

Figure 5:
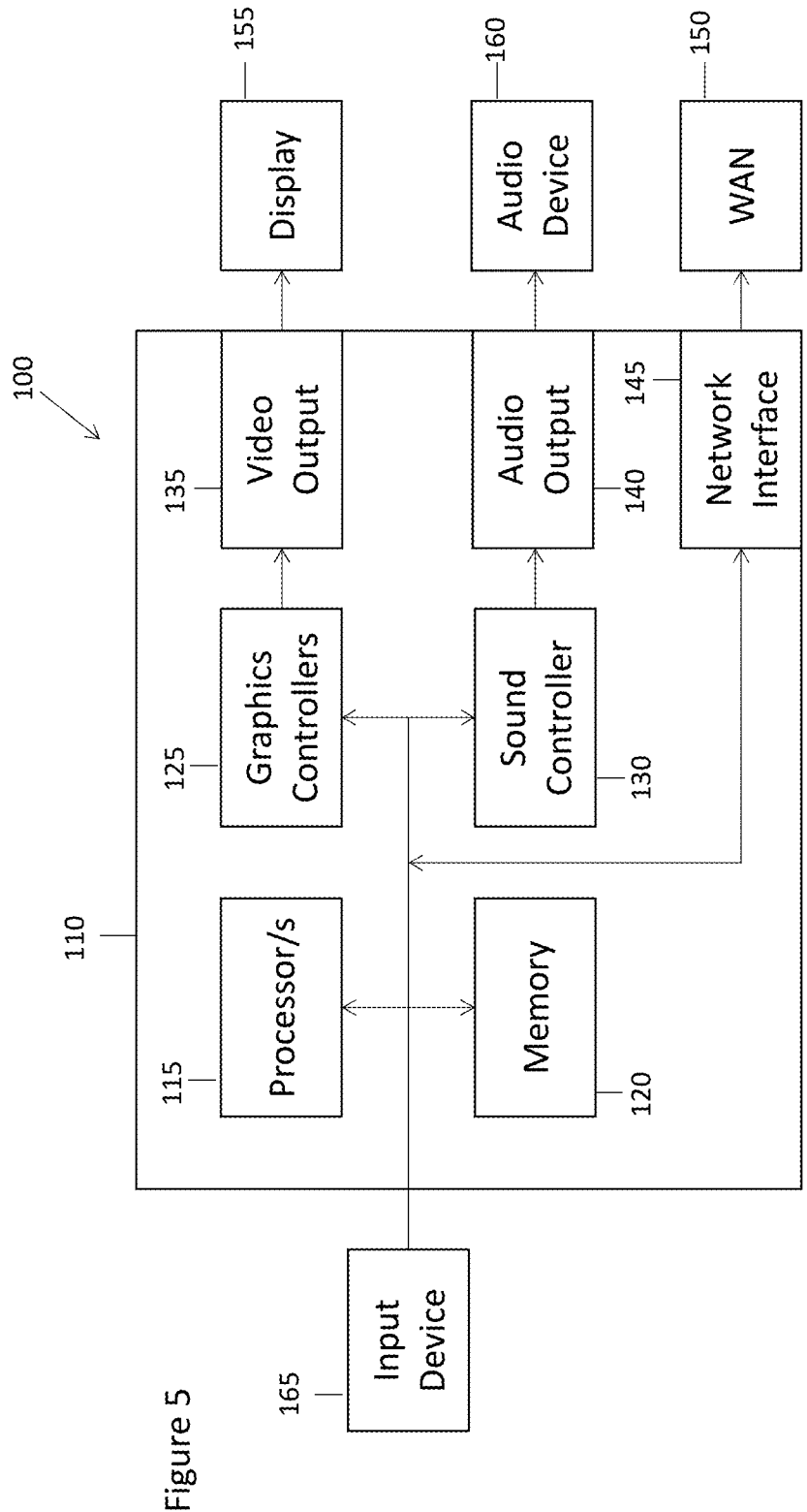
FIG. 5 shows an example user device in which some embodiments may be provided.

A schematic view of a user device 100 according to an embodiment is shown in FIG. 5. All of the blocks shown are implemented by suitable circuitry. The blocks may be implemented in hardware and/or software. The user device may have a control part 110. The control part may be implemented by one or more processors 115 and one or more memories 120.

The control part 110 is shown as having a graphics controller 125 and a sound controller 310. It should be appreciated that one or other or both of the graphics controller 125 and sound controller 130 may be provided by the one or more processors 115 or may be separately provided. The graphics and sound controllers may comprise memory and/or may operate in conjunction with the one or more memories 120.

The graphics controller 125 is configured to provide a video output 135. The sound controller 130 is configured to provide an audio output 410. The video output 135 is provided to a display 155. The audio out 140 is provided to an audio device 160 such as a speaker and or earphone(s).

The control part 110 has an interface 145 allowing the device to be able to communicate with a network such as the Internet or other communication infrastructure. For example the interface allows communication with a wireless area network WAN 150.

The device 100 has an input device or user interface 165. The input device can take any suitable format and can be one or more of a keyboard, mouse, touch screen, joystick or game controller. It should be appreciated that the display 155 may in some embodiments also provide the input device 165 by way of an integrated touch screen for example.

The blocks of the control part 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

Figure 6:
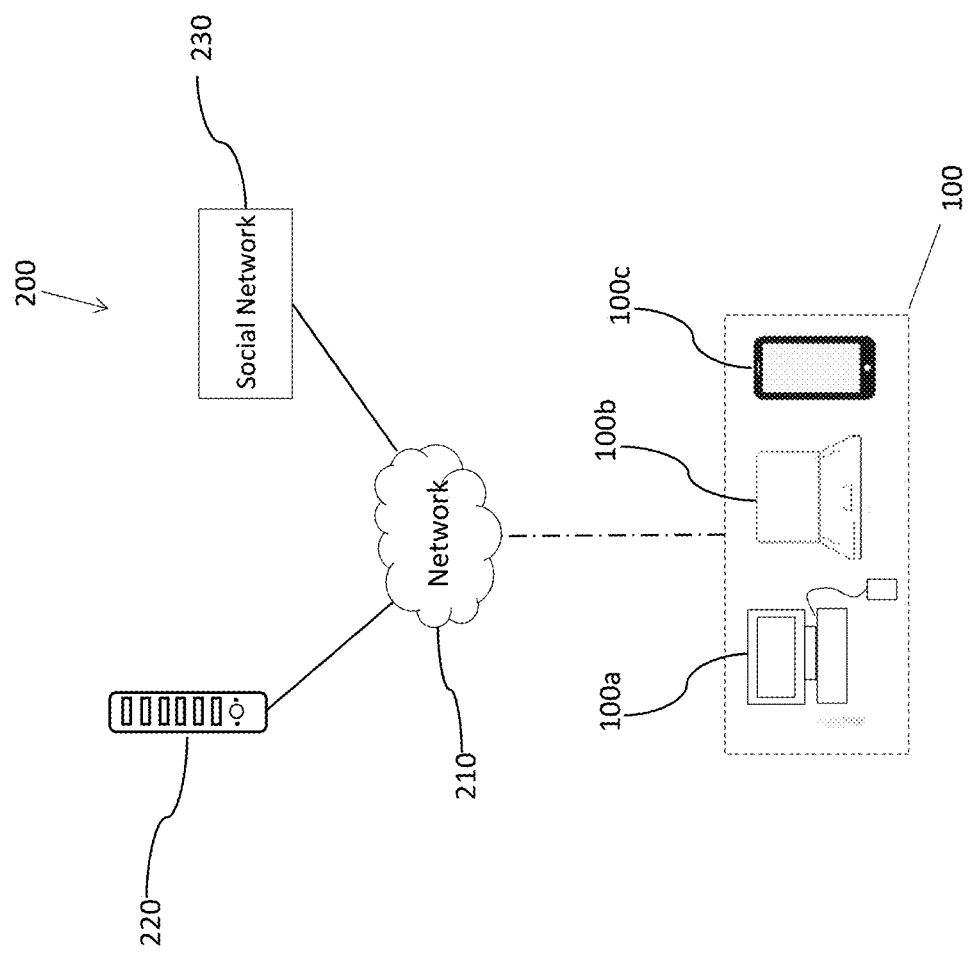
FIG. 6 shows an example system in which some embodiments may be provided.

FIG. 6 schematically shows a system 200 according to an embodiment. The system 200 comprises a server 220 which may be provided with a database or be connected to a database. The database may store game player's details, profiles, statistics etc. In practice, one or more servers 220 may be provided The server 220 may communicate via, for instance, the internet 210 to one or more client or user devices 100, such as shown in FIG. 5. By way of example, the user devices are shown as user devices 100a, 100b and 100c in FIG. 6. The internet 210 or the like may further provide connections to a social network 230, for example, Facebook™. The social network 230 may be provided with or connected to a database storing social user interaction details, for instance, user to user interaction maps, friend lists, location history etc.

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its saga or mission objectives. Some of the features may be locally executed on the device.

Some embodiments may be implemented to synchronize game state information and/or retrieve and connect to social graph information and user profile data on a social network such as Facebook or Google+.

Some embodiments may be implemented to enable connection to a plurality of social networks. The user may be given the option to select which information may be derived and/or shared with which social network.

Some embodiments may be provided in the context of so-called saga games. These are games which have one or more levels. In some games, a user may be required to complete a certain level before the user is able to progress to a next level. In some embodiments, the user may be able to go back and play any previous level.

A game may have a number of different levels. Different levels may have different requirements to be met. For example, some levels may have one or more specific goals. When a user selects a level, the user has to complete the specific goal in order to complete that level. For example, the user may be required to achieve a certain number of points, collect one or more given items, reach a particular location and/or the like. If the user fails to achieve that goal, the level is not completed. The user may be required to complete that level in order to reach another level.

Figure 3:
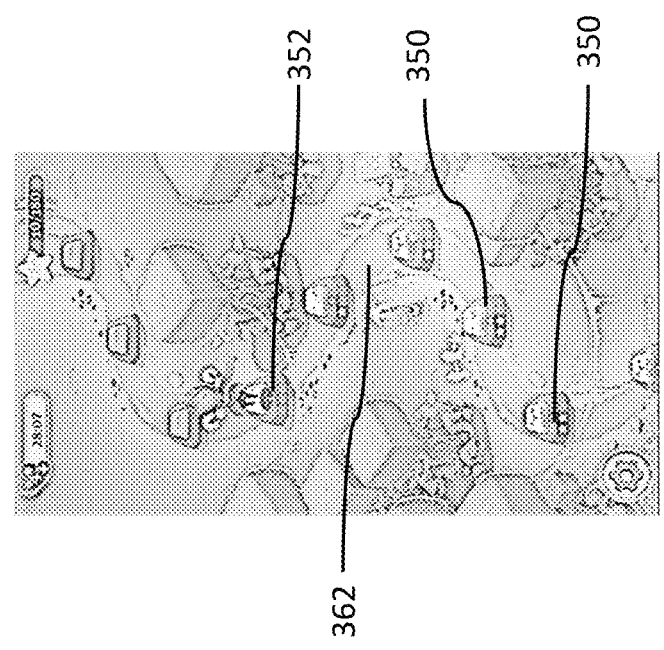
FIG. 3 schematically shows a representation of different levels of the example game.

In some embodiments, the different levels may be represented on a map 360. FIG. 3 schematically shows one example of such a view for the example game of FIGS. 2A and 2B. Different levels 350 are represented on a path 362 so that the user can see the progress which he has made playing the game. This also allows a user to go back and replay levels which he has previously played. The map view may show what levels have been completed as well as levels are left to play. Throughout the game and for each level completed, the player journeys across the map.

In some embodiments, the game can be implemented so that a player progresses through multiple levels of changing and for example increasing difficulty. In some embodiments, the difficulty of the levels may vary as the user progresses along the path. As the player travels through the levels in the game, his progress may be represented as a journey along a path in the virtual map. The current level 352 of the user may be indicated on the map. In some embodiments, the levels which have been completed may be displayed in a visually distinct manner from those levels which have yet to be completed.

In some embodiments, the player moves between levels and completes the levels one by one along a path by playing the game associated with that level. When the player achieves the goal of a level, the next level is unlocked and the player can play that level in the game.

The number of stages and levels can vary depending on the implementation. The levels may be numbered consecutively throughout the game or they can be numbered within a stage. Other ways of identifying the levels can be provided in other embodiments.

Figure 1A:
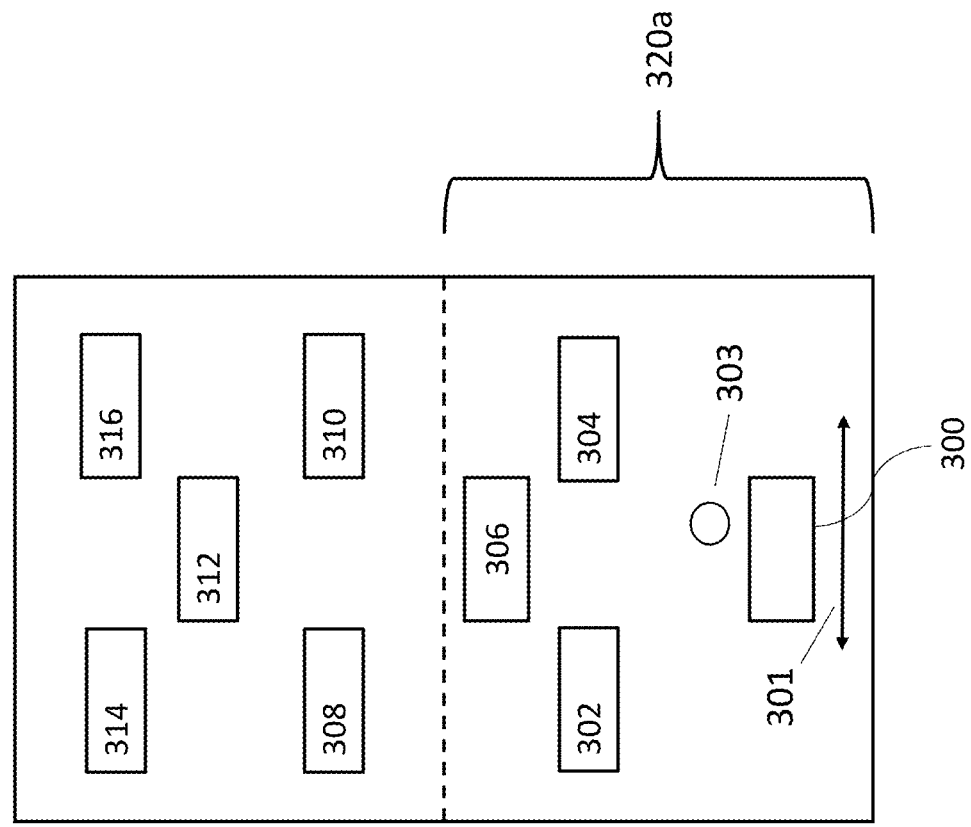
FIG. 1A shows a schematic example of an entire game area at a beginning of a game.

Reference is made to FIG. 1A which schematically shows a game area for brick breaker game at the beginning of a game. At the beginning of the game, only a first part 320a of the game area is displayed on the display of the user device. As can be seen from FIG. 1A, this means that a second part of the game area is not displayed on the display.

The brick breaker game comprises a first game object. In some brick breaker games, this is referred to as a paddle. This first game object is controlled by input from a user via the user interface. In some embodiments, the user is able to control the position of the first game object. In some embodiments, there may be limitations as to the extent of movement of the first game object. For example, the first game object may only be movable perpendicular to the longitudinal extent of the game area. This is indicated schematically in FIG. 1A by arrow 301.

It should be appreciated that in other embodiments, the first game object may have a different or further range of possible movement.

The first game object may be controlled to cause the release of a second different type of game object 303. This second type of game object may be a ball or projectile. In other embodiments, this second type of game object may be visually represented in any suitable manner. In some embodiments, there may be an unlimited supply of second game objects during the game. In other embodiments, the number of second game objects may be limited to one or more second game objects within a game.

The first game object may be controlled to release the second game object by user interaction via the user interface. In some embodiments only one second game object may be in play at any given moment. In other embodiments, the number of second game objects in play at any given time may be two or more.

In some embodiments, the second game object is released so as to "hit" or collide with one or more third game objects. These third game objects are bricks. However, these third game objects may be visually represented in any suitable manner. The third game objects may be arranged in one or more groups of one or more third game objects. In the example shown in FIG. 1a, there are eight groups of third game objects. However this is by way of example only and there may be more or less than eight groups. Where the third objects are arranged in groups, the groups may be arranged in any suitable orientation. The groups may have the same or differing numbers of third game objects. The third game objects in a group may be next to other third game objects and/or spaced apart from other third game objects of that group. Adjacent groups may be spaced apart from one another and/or may have one or more third game objects of one group next to one or more third game objects of another group.

In other embodiments, the third objects may be arranged in a single group.

In some embodiments, when a second game object hits or collides with a third game object, the third game object is removed. In some embodiments, the third game objects need to be hit more than once in order to be removed.

Referring back to FIG. 1A, when a game is started, the display is controlled such that top of the game area is initially displayed and the game area is then scrolled until only the first part of the game area, at the opposite end to the top of the game area is displayed. This first part of the game area is referenced 320a. In some embodiments, there is no scrolling of the game area before the game is played. Groups 302, 304 and 306 are displayed, after the initial scrolling. Groups 308, 310, 312, 314 and 316 are not displayed, after the initial scrolling.

Using the first game object, one or more second game objects are released. This is controlled by user interaction via the user interface. In some embodiments, where the user interface is provided by a touch screen, touching the first object and then releasing the first object may cause the one or more second game objects to be released. In some embodiments, the user is able to control the direction in which the one or more second game objects are released, via the user interface. The one or more second objects may hit one or more of an edge of the game area and one or more third game objects. The edge of the playable game area may be represented by a wall or in any other suitable manner. The wall or similar object will allow the second object to bounce back into the game area. In the case that a third game object only needs to be hit once to be removed, that third game object will be removed if it is hit. Where a third game object needs to be hit n times (n being greater than 1), it may be determined when that third game object has been hit if that third game object has now been hit n times. If so, that third game object will be removed. If not, that third game object remains in the game area.

Typically the second game object will bounce around the game area before returning to the lower part of the game area where the first game object is located. The first game object will be moved to interact with the second game object. The position of the first game object is thus controlled by the user via the user interface with the aim of the first game object being in the path of the second game object which causes the second game object to be caught or bounced back up into the game area.

Figure 1B:
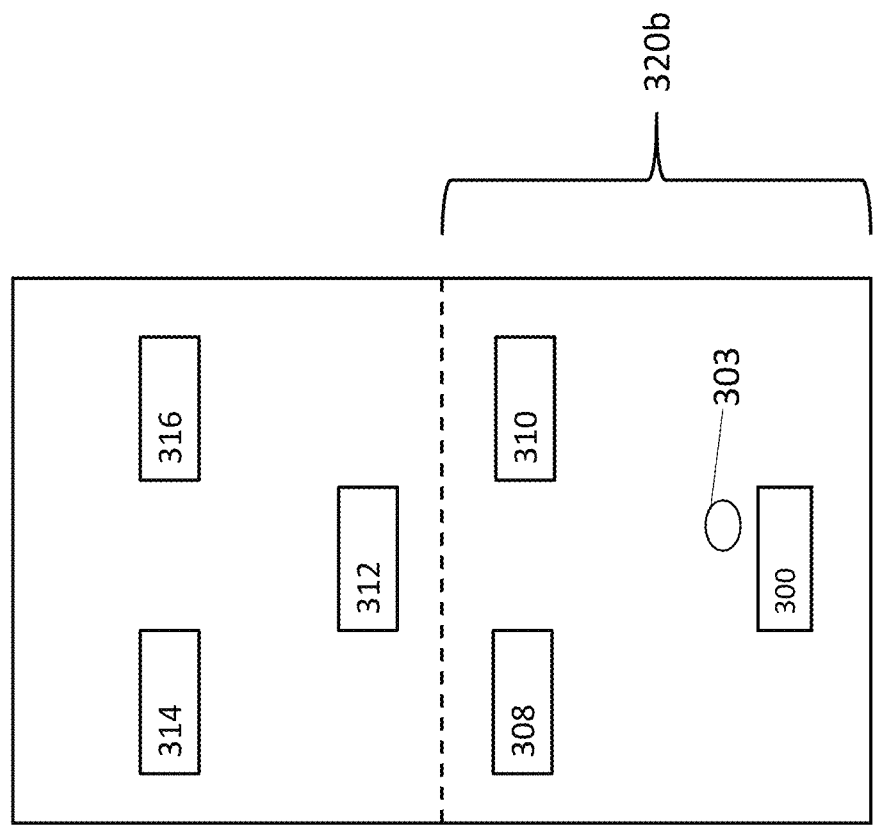
FIG. 1B shows a schematic example of the game area during the game.
Figure 1C:
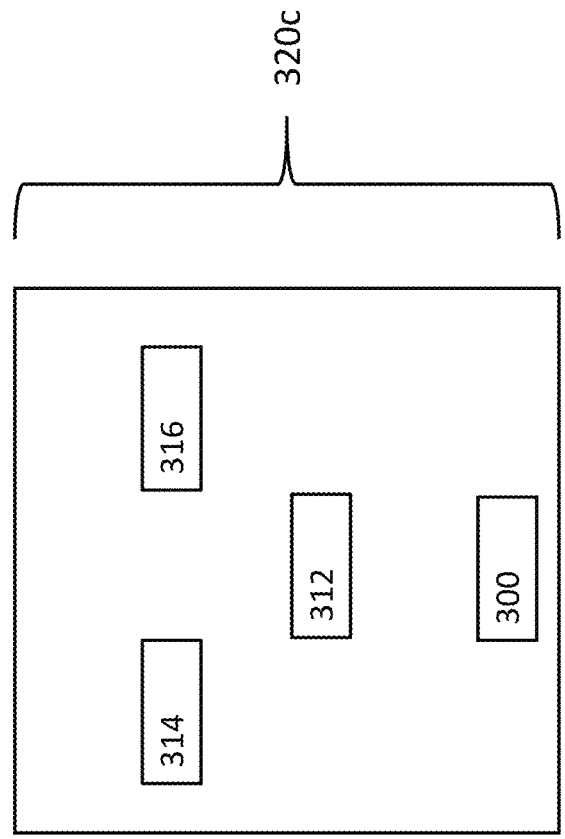
FIG. 1C shows a schematic example of the remaining game area towards the end of a game.

In some embodiments, when given ones of the third game objects are removed, the game area is scrolled up and the first game object is repositioned to be at the lower end of the new game area. In the example of FIGS. 1A to 1C, when the third game objects in groups 302, 304 and 306 have been removed, then the next part of the game area, as shown in FIG. 1B is displayed. This is referenced 320b. Thus there is still part of the game area which is not displayed. Groups 308 and 310 are displayed. Groups 312, 314 and 316 are not displayed.

Similarly, when the third game objects in groups 308 and 310 are removed, the game area is scrolled up and the first game object is repositioned to be at the lower end of the new game area. The next part of the game area, as shown in FIG. 1C is displayed. This is referenced 320c. Groups 312, 314 and 316 are displayed. In this case, there is no longer any part of the game area which is not displayed.

In this example, the game area can be regarded as being provided in sections. Removal of all of the third game objects in a section is required before the next section can be displayed. In other embodiments, as soon as given ones of the third game objects are removed, the game area is incremented or moved forward so as to display a new part of the game area. That new part of the game area may comprise new third game objects and/or an area with no third game objects. The displayed game area will also comprise part of the previously displayed game area which may comprise one or more previously displayed third game objects and/or an area with no third game objects. The first game object would be repositioned at the bottom of the new game area as previously discussed.

Reference is made to FIGS. 2A and 2B which show one example of how the computer game may appear. The first game object 300' is represented by a paddle, in this specific example the paddle is visualized as person with a ring but it should be appreciated that the paddle could be visualized in other different ways. The second game object (not shown) may be visually represented by a ball. The third game objects are visually represented as blocks or bricks.

FIG. 2A shows the upper part of the game area which is initially displayed when the user starts to play a game. As mentioned, this game area is then scrolled through on the display until the lower part of the game area (the first part of the game area 320a') is displayed. This is shown in FIG. 2B.

It should be appreciated that the game area of FIGS. 2A and 2B have a different arrangement of groups of third game objects to the example of FIGS. 1A to 1C. These groups of third game objects in FIGS. 2A and 2B are referenced 330, 332, 334, 336 and 338.

It should be appreciated that there are further game objects, fourth game objects 340 in the example game of FIGS. 2A and 2B. These fourth game may need to be removed in order to progress to the next part of the game area and/or may provide an additional effect such as extra power or extra lives.

Figure 4:
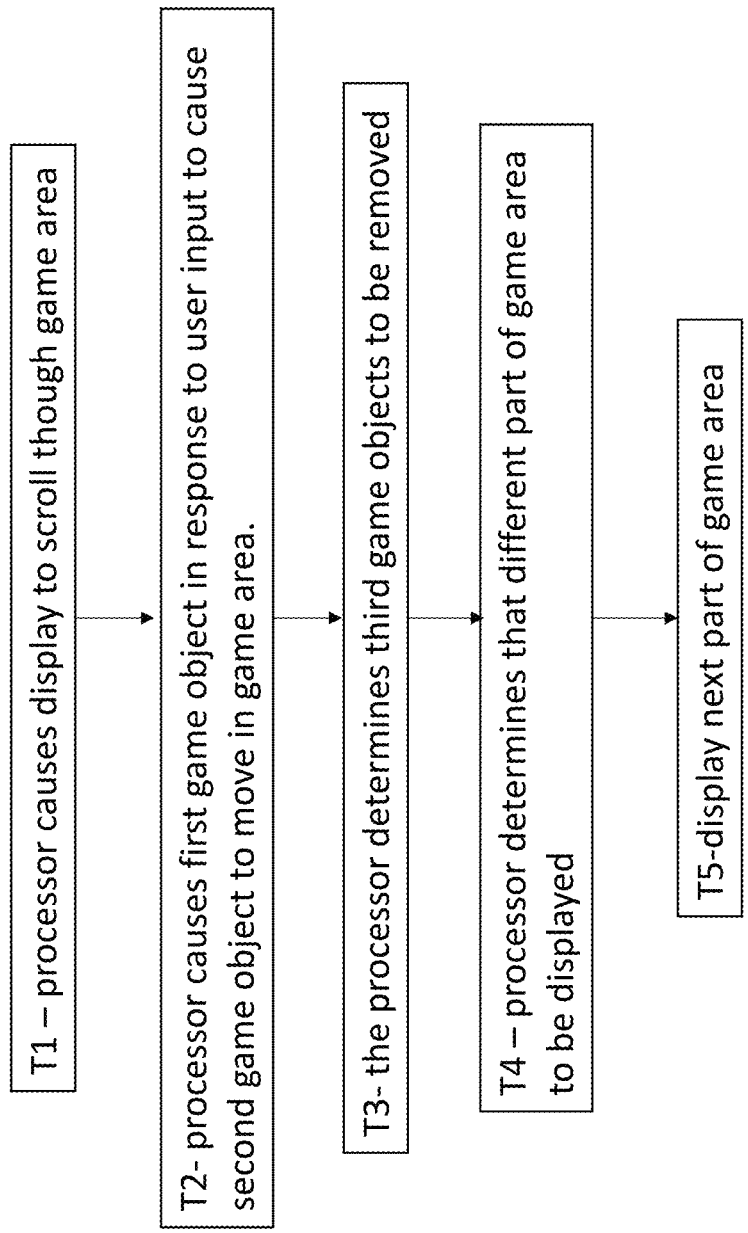
FIG. 4 is a first flowchart according to an embodiment.

Reference is made to FIG. 4 which shows a computer implemented method of an embodiment. This may be performed in the user device.

In step T1, the processor is configured to cause the display to scroll through the game area until the lowermost part of the game area is displayed. This feature is optional is some embodiments and in other embodiments the lowermost part of the game area may be initially displayed. In some embodiments a thumbnail or similar may be provided on the display before and/or during the playing of the game. In some embodiments, the game area is only revealed as the player plays the game.

In other embodiments, the scrolling through the game area may be controlled by the user via the user interface.

In step T2, the processor is configured to cause the first game object to be controlled in response to user input received by the interface to cause the second game object to move in the game area. The first game object may launch the second game object or bounce the second game object back into the game area.

In step T3, the processor is configured to cause third game objects to be removed. This is in response to a determination by the processor that a respective third object has been hit by a second game object and/or that one or more other conditions have been satisfied for the removal of that third game object. One of these conditions may be that the third game object has been hit a predetermined number of times.

In step T4, the processor is configured to determine that given ones of the third game objects have been removed such that a different part of the game area can be displayed.

In step T5, the processor is configured to cause the next part of the game area to be displayed and reposition the first game object such that it is displayed within the next part of the game area.

In some embodiments, a check is made each time a third game object is to be removed to see if the given ones of the third game objects have all been cleared. If not, the check is repeated when the next third game objects is removed. In this embodiment, steps T2 and T3 may be repeated until a check in step T4 is satisfied.

In some embodiments, the criteria for determining that a next part of the game area is to be displayed is that the all third objects with a given distance from the first object have been removed or that all the third objects a certain distance from the first object along one or more directions have been removed. One direction may be the direction of scrolling. Another direction may be parallel to the direction of scrolling.

In some embodiments, the removal of a third game object may depend on whether the third game object is directly hit by the second game object or if the second game object has bounced via another third game object, another game object or the edge of the game area before hitting that third game object.

Figure 7:
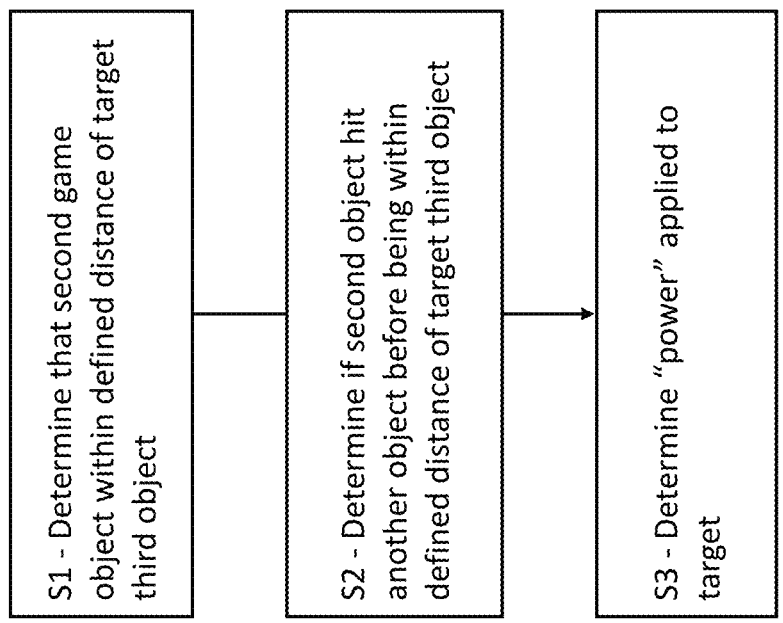
FIG. 7 is a second flowchart according to an embodiment.

Reference is made to FIG. 7 which shows a method performed in some embodiments in a user device. The method is a computer implemented method.

In step S1, the processor is configured to determine that the second game object is within a defined distance of a target third object. For example the processor is configured to determine that the second game object has hit or is about to hit a third object. This may alternatively or additionally take into account the trajectory of the second game object. In one embodiment, the second game object may have a power attribute which is set (e.g. to 1) when it for example contacts the paddle.

In step S2, the processor is configured to determine if the second object hit another object before being within the defined distance of the target third object. This may be determined by considering the power attribute of the second game object. The power attribute may be reset (for example set to 0) when the second game object hits another object. The another object may be another third object, an obstacle, a fourth game object, an edge of the display and/or any other object. In some embodiments, the processor may consider the path from the first object to the target third object to make this determination. Other embodiments may use a different technique.

In step S3, based on this determination, the power applied to the target third object is determined. In other words, it may be determined if the second object has the power attribute set or not. In some embodiments, the "power" will determine the number of third objects which are to be removed. For example, if the second object has not hit anything prior to hitting the target third game object, the target third game object and one or more adjacent third game objects are removed. In some embodiments, up to two third game objects are removed. If the second object has hit something else already, then only the target third game object is removed.

In some embodiments, the third objects have a "hardness" attribute which defines how many times the third object needs to be hit before being removed. For example, one or more third objects may have a hardness of 2 meaning that the third object needs to be hit by the second game object twice before that object is removed. Each time the third object is hit, the hardness value is reduced by one. However, if the second game object has the power attribute set, this will reduce the hardness value by 2.

Thus is a third object with a hardness of 2 is hit by a second game object with the power attribute set, this will cause that third game object to be removed.

If the third game object has a strength of 1 and it is hit by the second game object with the power attribute of 1, that third game object is removed and the second game object moves along to the next game object. In some embodiments, this is without modifying the path of the second game object, for example, without bouncing. If that next game object is a third game object, it will have its strength reduced by 1. Depending on the number of times that the third game object has been hit already (or not) that third game object may or may not be removed.

If the third game object has a hardness of 3, and it is hit by the second game object with the power attribute of 1, that third game object has its hardness reduced to 1. The third game object is not removed and the second game object will bounce off that third object.

The power attribute provided by the second object may have more than two options (set or reset) or values. It should be appreciated that any suitable way of indicating if the power attribute is provided or not and/or the value of that attribute may be used.

A counter function (count up or count down) may be provided to support the providing of a plurality of different power attribute values. The counter function may be provided by hardware and/or software. Other embodiments, may manage the power attribute without a counter.

In some embodiments, the power attribute may be omitted.

There may be one or more additional or alternative method for providing the current power values and/or using up the power values.

The power attribute may be stored by the processor in the memory.

The hardness values may be stored by the processor in the memory.

The processor may be configured to update the power attribute(s) and/or the hardness values.

In the example described, one or more third objects are provided with a hardness value of up to 2. In some embodiments, there may be more than 2 hardness values for one or more third objects, additionally or alternatively. It should be appreciated that any suitable way of indicating if the hardness attribute is provided or not and/or the value of that attribute may be used.

The hardness attribute may be omitted in some embodiments.

A counter function (count up or count down) may be provided to support the providing of a plurality of different hardness values. The counter function may be provided by hardware and/or software. Other embodiments, may manage the hardness attribute without a counter.

In some embodiments, this method may only be carried out for the first target third game object after the second game object is initially released by the first game object. In other embodiments, this method may be carried out after each time the second game object has made contact with the first game object.

In the previously described embodiments, reference has been made to a lower and upper part of the game area. This is by way of example only and the game area may be scrolled from left to right, right to left or down to up. In some embodiments, the progression through the game area may be more complex and may have one or more components of left or right and up or down from one display area to the next.

It should be appreciated that the visualization of the first, second, third and fourth game objects may take any suitable form.

Some embodiments may be provided on a user device such as a smart phone. It should be appreciated that other embodiments may be provided by any other suitable device such as a computer, a laptop computer, a tablet or the like.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device configured to provide a computer implemented game, the computer device comprising:
   a user interface configured to detect user input from a user of the game,
   at least one processor, and
   a display,
   the at least one processor being configured to:
      cause a first part of a game area to be displayed on the display, the first part of the game area initially comprising a first game object which is controllable by user input to move sideways within a lower region of the first part of the game area and a plurality of third game objects, the plurality of third game objects comprising a set of given third game objects, each given third game object having a respective given position, the set of given third game objects comprising one or more but not all of the plurality of third game objects;
      cause the first game object to be moved sideways within the first part of the game area in response to user input received via the user interface to reposition the first game object such that a second game object hits the first game object and is reflected from the first game object to hit one or more of the plurality of third game objects, the second game object being provided with a power attribute value which is set when the second game object hits the first game object and updated when the second game object hits a given number of items;
      cause one or more of the plurality of third game objects which have been hit by the second game object to be removed from the first part of the game area, wherein the second game object is reflected in the first part of the game area after hitting the one or more third game objects to return to the lower region of the first part of the game area such that further user input received via the user interface is configured to move the first game object sideways within the first part of the game area such that the second game object hits the first game object which causes the second game object to be reflected back into the first part of the game area and the power attribute of the second game object to be set again;
      determine, in response to the removal of one or more third game objects, if each third game object of the set of given third game objects have been hit at and removed from its respective given position; and
      when it is determined that each third game object of the set of given third game objects have been hit and removed from its respective given position, cause a second part of the game area to be displayed, the first game object being moved from the lower region of the first part of the game area to be in a lower region of the second part of the game area, the second part of the game area comprising a further plurality of third game objects which are removable in response to being hit by the second game object.

2. A computer device as claimed in claim 1, wherein the at least one processor is configured to cause the display to initially scroll through all of the game area.

3. A computer device as claimed in claim 1, wherein the at least one processor is configured to cause the display to scroll from the first part of the game area to the second part of the game area.

4. A computer device as claimed in claim 1, wherein the first and second parts of the game area overlap.

5. A computer device as claimed in claim 1, wherein the first and second parts of the game area are non-overlapping.

6. A computer device as claimed in claim 1, wherein given ones of the third game objects are arranged in one or more groups.

7. A computer device as claimed in claim 1, wherein the game area comprises at least three parts, the at least one processor being configured to cause a next part of the game area to be displayed when each given third game objects in a previous part of the game area have been removed.

8. A computer device as claimed in claim 1, wherein the at least one processor is configured to determine if a first third game object is a first item that the second game object has hit after reflection from the first game object and if so to cause said second game object to continue on its path to remove at least one further third game object as well as said first third game object.

9. A computer device as claimed in claim 1, wherein the at least one processor is configured to determine for at least one third object which has been hit if at least one condition has been satisfied and to only remove that third object when the condition has been satisfied.

10. A computer device as claimed in claim 9, wherein the at least one condition comprises that the third object has been hit an equivalent of n times, where n is an integer greater than one.

11. A computer device as claimed in claim 10, wherein the at least one processor is configured to update a count value when a respective third object has been hit.

12. A computer device as claimed in claim 11, wherein when the second game object hits a first third game object, the at least one processor updates the count value by m, where m is an integer greater than one and dependent on the power attribute value.

13. A computer device as claimed in claim 12, wherein the at least one processor is configured to update the power attribute value after the second game object has hit the first third game object.

14. A computer device as claimed in claim 13, wherein when the second game object hits a further third game object after hitting the first third game object, the at least one processor is configured update the count value for that further game object by an integer value less than m, in dependence on the updated power attribute value.

15. A computer device as claimed in claim 1, wherein the given number of items is one.

16. A computer device as claimed in claim 1, wherein at least one third object has a third object value indicating an amount of power required to remove the respective third object, the at least one processor being configured to update the third object value when the second game object hits the third object by an amount dependent on the power attribute value of the second game object.

17. A computer device as claimed in claim 16, wherein the respective third object is removed when the third object value has a given value.

18. A computer implemented method for providing a computer implemented game on a computer device comprising a user interface configured to detect user input from a player of said game, at least one processor, and a display, the method comprising:
   causing a first part of a game area to be displayed on said display, said first part of the game area initially comprising a first game object which is controllable by user input to move sideways within a lower region of the first part of the game area and a plurality of third game objects, the plurality of third game objects comprising a set of given third game objects, each given third game object having a respective given position, the set of given third game objects comprising one or more but not all of the plurality of third game objects;
   causing said first game object to be moved sideways within the first part of the game area in response to user input received via said user interface to reposition the first game object such that a second game object hits the first game object and is reflected from the first game object to hit one or more of said plurality of third game objects, the second game object being provided with a power attribute value which is set when the second game object hits the first game object and updated when the second game object hits a given number of items;
   causing hit one or more of the plurality of third game objects which have been hit by the second game object to be removed from the first part of said game area, wherein the second game object is reflected in the first part of the game area after hitting the one or more third game objects to return to the lower region of the first part of the game area such that further user input received via the user interface is configured to move the first game object sideways within the first part of the game area such that the second game object hits the first game object which causes the second game object to be reflected back into the first part of the game area and the power attribute of the second game object to be set again;
   determining, in response to the removal of one or more third game objects, if each third game object of the set of given third game objects have been hit at and removed from its respective given position; and
   when it is determined that each third game object of the set of given third game objects have been hit and removed from its respective given position, causing a second part of the game area the displayed, said first game object being moved from the lower region in the first part of the game area to be in a lower region of the second part of the game area, the second part of the game area comprising a further plurality of third game objects which are removable in response to being hit by the second game object.

19. A method as claimed in claim 18, comprising determining if a first third game object is a first item that the second game object has hit after interaction with the first game object and if so causing said second game object to continue on its path to remove at least one further third game object as well as said first third game object.

20. A method as claimed in claim 18, comprising determining for at least one third object which has been hit if at least one condition has been satisfied and only removing that third object when the condition has been satisfied.

21. A method as claimed in claim 20, wherein the at least one condition comprises that the third object has been hit an equivalent of n times, where n is an integer greater than one.

22. A method as claimed in claim 21, comprising updating a count value when a respective third object has been hit.

23. A method as claimed in claim 22, comprising, in response to the second game object hitting a first third game object, updating the count value by m, where m is an integer greater than one and dependent on the power attribute value.

24. A method as claimed in claim 23, comprising updating the power attribute value after the second game object has hit the first third game object.

25. A method as claimed in claim 24, comprising, in response to the second game object hitting a further third game object after hitting the first third game object, updating the count value for that further game object by an integer value less than m, in dependence on the updated power attribute value.

26. A non-transitory computer program product comprising a computer readable storage device having a computer readable program code stored therein, said computer readable program code containing instructions configured to be executed by at least one processor to implement a method, said method comprising:
   detecting, on a user interface, user input from a user of a game;
   displaying on a display, a first part of a game area initially comprising a first game object which is controllable by user input to move sideways within a lower region of the first part of the game area and a plurality of third game objects, the plurality of third game objects comprising a set of given third game objects, each given third game object having a respective given position, the set of given third game objects comprising one or more but not all of the plurality of third game objects;
   controlling, by at least one processor, the first game object to move sideways within the first part of the game area in response to user input received via the user interface to reposition the first game object such that a second game object hits the first game object and is reflected from the first game object to hit one or more of the plurality of third game objects, the second game object being provided with a power attribute value which is set when the second game object hits the first game object and updated when the second game object hits a given number of items;
   removing, by the at least one processor, one or more of the plurality of third game objects which have been hit by the second game object from the first part of the game area, wherein the second game object is reflected in the first part of the game area after hitting the one or more third game objects to return to the lower region of the first part of the game area such that further user input received via the user interface is configured to move the first game object sideways within the first part of the game area such that the second game object hits the first game object which causes the second game object to be reflected back into the first part of the game area and the power attribute of the second game object to be set again;
   determining, by the at least one processor, in response to the removal of one or more third game objects, if each third game object of the set of given third game objects have been hit and removed from its respective given position; and when it is determined that each third game object of the set of given third game objects have been hit and removed from its respective given position, causing, by the at least one processor, a second part of the game area to be displayed on the display, the first game object being moved from the lower region in the first part of the game area to be in a lower region of the second part of the game area, the second part of the game area comprising a further plurality of third game objects which are removable in response to being hit by the second game object.

* * * * *